March 21, 1933.  E. L. HUBBARD  1,902,329
LIQUID GAUGE
Filed March 12, 1929
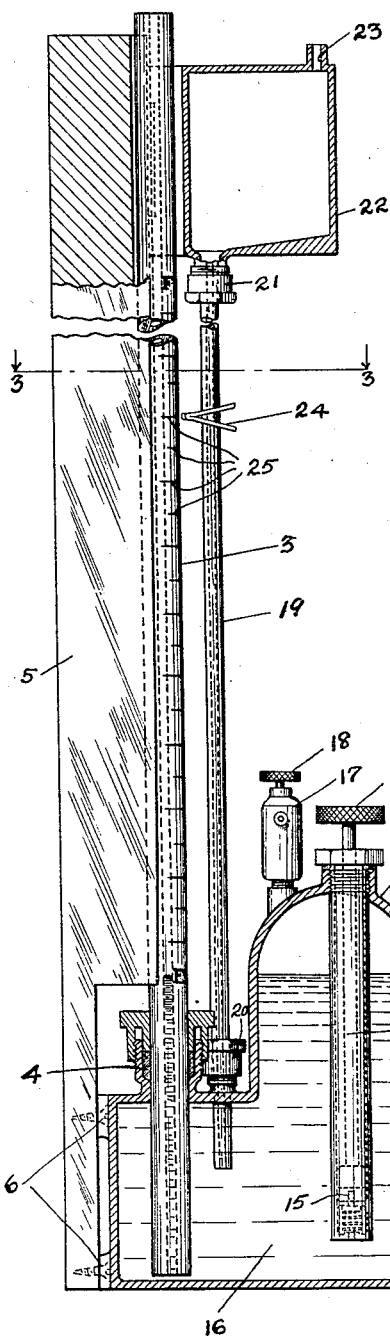
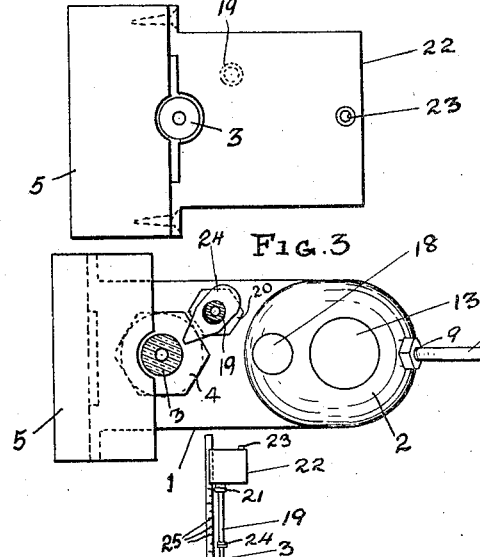
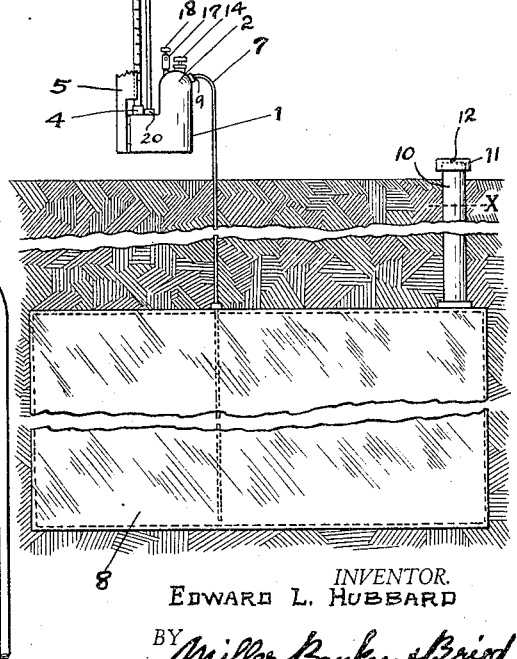
INVENTOR.
EDWARD L. HUBBARD
BY *Miller Boyken & Bried*
ATTORNEYS.

Patented Mar. 21, 1933

1,902,329

UNITED STATES PATENT OFFICE

EDWARD L. HUBBARD, OF PIEDMONT, CALIFORNIA, ASSIGNOR TO WATER WORKS SUPPLY COMPANY, OF SAN FRANCISCO, CALIFORNIA, A CORPORATION OF CALIFORNIA

LIQUID GAUGE

Application filed March 12, 1929. Serial No. 346,317.

This invention relates to liquid gauges as used for indicating the depth of liquid stored in tanks, particularly gasoline and oil kept in underground tanks and of which it is desired to indicate the depth of the liquid in the tank on a scale above ground at some point remote from the tank, such for instance as the depth of gasoline in a buried tank where the reading is to be made at the side of or within the house of a gasoline service station.

The objects of the invention are to provide improved apparatus for the purpose above outlined which will be simple to make, install, and operate, and will give a reliable reading of the depth of a liquid in the tank at all times, and also such an apparatus which is not easily put out of order.

Buried tanks generally involve a condition not met with in above-ground storage, that is, such tanks if far below the ground have a considerable length of standing neck or filling pipe extending above them, and which may be as great or greater in length than the total depth of the tank itself, and thus when the tank is filled the liquid rising in the filling neck induces almost twice the static head on the liquid at the bottom of the tank, and thereby brings in a condition to bear on the liquid indicator used in such a tank which would not seem properly handled by prior indicators with which I am familiar, and which it is one of the objects of the present invention to meet.

In the drawing accompanying this application Fig. 1 is an elevation of my apparatus partly in section and broken in length showing all the important features thereof.

Fig. 2 is a top plan view of the upper end of the apparatus.

Fig. 3 is a cross section of the apparatus as seen from the line 3—3 of Fig. 1.

Fig. 4 is a reduced size elevation of the apparatus and showing a portion of the earth in section with a buried tank therein complete with its stand pipe or filling neck, and my apparatus connected thereto for indicating the depth of the liquid therein.

Briefly described my apparatus comprises a closed chamber containing a heavy liquid, and provided with a sight tube extending vertically from the same, the lower end of the tube being immersed in the heavy liquid and terminating near the bottom of the chamber. An air dome is provided on the chamber and an air pipe leads from the dome down to the inside of the buried storage tank and terminates with an open end close to the bottom thereof. An air pump is provided on the chamber, preferably on the dome thereof, for inducing a pressure within the chamber so that the column of gasoline or other liquid within the storage tank which would normally rise within the air pipe, can be forced down and out of the air pipe against the head of the liquid in the tank, and at the same time the pressure will force the heavy liquid up in the sight tube to balance the air pressure and thus indicate along a graduated scale the depth of liquid in the storage tank, or rather will indicate the pressure required to force the liquid out of the air pipe against the particular head of liquid existing in the storage tank at that time.

In terms of greater detail the device of my invention comprises a chamber 1, preferably made of a metal casting and provided with the air dome 2. Observation is effected through the medium of a glass sight tube 3 extending vertically into the chamber and made tight by a suitable stuffing box as indicated at 4. The tube is stabilized by means of a vertical supporting block 5 preferably of wood and which block is rigidly secured to the chamber 1 as by the screws 6. The block 5 is preferably grooved to receive a portion of the tube as indicated.

From the air space in the dome 2 extends an air pipe 7 which may run any distance to the tank in which the liquid level is to be gauged, such for instance as the buried tank 8 shown in Fig. 4 and wherein the pipe 7 passes vertically down through the tank and terminates adjacent the bottom thereof with an open end as indicated. It is to be understood that the joint 9 through which the pipe 7 passes is to be made air-tight.

The storage tank 8 of Fig. 4 is shown with a standing pipe or filling neck 10 usually closed with a cap 11 and which cap is provided with a small air vent 12.

Extending vertically through the dome 2 of the chamber 1 is an air pump 13 consisting of a metal cylinder preferably screwed in place and provided with a hand-operated plunger 14 and check valve at its lower end as indicated at 15 so that upon operating the plunger 14 air may be drawn from the outside and forced down and out of the lower end of the pump to bubble up through the heavy liquid 16 contained in the chamber and accumulates under pressure in the dome 2. It is desirable that the gauging liquid 16 in the chamber be considerably heavier than the liquid to be measured in the under-ground tank so that a column of the heavy liquid will balance a much higher column of the liquid in the storage tank. The heavy liquid 16 may be mercury if desired though this is unnecessarily heavy in the gauging of gasoline and similar liquids, and I find in practice that aniline oil is very satisfactory as it has about twice the weight of ordinary gasoline.

Mounted on top of the dome is an air pressure relief valve 17 provided with an adjusting nut 18 by which it may be set to relieve the air pressure at any predetermined point. This air relief valve may be of any standard construction such as an adjustable safety valve adapted to operate at very low pressure.

Adjacent the glass sight tube 3 is another and preferably smaller tube 19 which may be of metal and which extends vertically through a stuffing box 20 into the chamber 1 and terminates at a point considerably above the lower end of tube 3 as indicated. The upper end of tube 19 is connected with a liquid tight joint 21 to a chamber 22 herein termed an "overflow chamber". This overflow chamber is a hollow box secured to the vertical block 5 as indicated and provided with a channel or cut out portion which straddles the sight tube 3 as shown and thereby holds the upper end of sight tube firmly in place in the groove formed in block 5.

Overflow chamber 22 is closed on top and provided with an air escape opening 23 having an offset relation to the open upper end of tube 19 so that if any liquid is shot upwardly out of tube 19 it will strike the closed end of the overflow chamber and fall back within the chamber without being ejected through the air escape opening.

On tube 19 I preferably provide one or more slidable indicating fingers as indicated at 24. These fingers 24 are simple frictional clamps which may be slid up or down to any required point to indicate the scale of depth which may be marked on the sight tube 3 as shown at 25.

When installing my apparatus, and with the storage tank empty, the heavy liquid in the chamber 1 lies at the level E thus indicating the storage tank to be empty. If with the storage tank empty the pump handle 14 was operated, any air accumulating in the dome 2 would find free passage through pipe 7 into the empty storage tank 8 and out of the air vent 12 in the stand pipe thereof, and hence the liquid level in the chamber 1 would not change in the sight tube 3 but would continue to indicate "empty".

However, when the storage is, say half full of liquid, and the pump handle 14 is operated to build up a pressure in the dome and pipe 7 until it is sufficient to expel the storage liquid entirely out of the lower end of pipe 7, it is manifest that the same pressure will react on the heavy liquid 16 and force a column to rise in the sight tube 3 until a balance is obtained, and at which point the reading on the sight tube would indicate half full, it being understood that the length of the sight tube 3 is dependent on the weight of the liquid used in the chamber 1 in comparison to the weight of the liquid kept in the under-ground storage tank.

If with the indicator reading half full and the storage tank half full the level in the storage tank gradually falls, it is manifest the the air pressure in the dome be greater than necessary to keep the pipe 7 blown out, will permit escape of air from its lower end to bubble up through the gasoline until the proper balance is obtained, and consequent falling of the sight column in tube 3.

Assuming as another example that the gasoline in the under-ground tank was up to the line X on the stand pipe, and the pump 14 were operated in an attempt to eject all the gasoline from pipe 7. It is manifest that the standing head of gasoline from line X in the stand pipe being so great would build up a very high pressure in the dome 2 so that ordinarily the heavy liquid would be ejected clear out of the upper open end of the sight tube 3 unless it were prohibitively long. In prior apparatus of this kind it was customary to have a large receiving chamber on top of the sight tube 3 so as to receive the liquid in case of such extreme pressure being developed, but this was found unsatisfactory owing to the fact that air bubbles would blow up through the sight tube, the oil would flow going back into the sight tube, and an extra joint was required on top of the sight tube for this overflow container. I provide for the emergency above mentioned by the pressure relief valve 17 which may be set to blow when the pressure has risen high enough to hold the sight column of liquid at the point F for "full" and thus no matter how high the gasoline rises in the neck 10 of the storage tank the sight gauge will never rise higher than the graduation F. However, as an extra provision against the possibility of the valve 17 not operating, I provide the standing or overflow tube 19 connected to the overflow chamber 22 as previously described, and in which tube 19 it is manifest the heavy liquid will always rise to the same height as in the sight tube 3 and thus if the storage tank was filled to a point above the lower end of the filling neck, so that when the hand pump 14 was operated the pressure would tend to force the reading column above the F point, the tube 19 would discharge the heavy liquid into the overflow chamber 22, and since the lower end of tube 19 terminates at a point considerably above the lower end of tube 3 it is manifest that the falling level of liquid 16 would freely reach the lower end of tube 19 and admit the air compressed within the chamber so that it violently ejects the entire line of oil out of tube 19 against the closed top of chamber 22, and thus immediately break the air pressure so that the air could escape through vent 23. This of course would immediately permit the sight column of liquid to fall in the tube down to zero and slowly the overflow liquid in tube 22 could run back through the tube 19 into the chamber. Such a sudden drop of the sight column would indicate at once to the operator that the storage tank was filled well up into the neck of the stand pipe, though of course it is evident that the adjustable valve 17 could be so set that it would always blow specially when the tank was full to the bottom of the filling neck and the sight column had reached the F graduation on the scale.

By the construction above specified it will be seen that the sight column in tube 3 is always kept clean and free from air bubbles and is never required to function as an overflow column into any tank above, but is always in best condition for reading the actual depth of the liquid in the storage tank.

Also to be observed is the fact that the form of my chamber 1 in being provided with an air dome keeps the stuffing boxes 4 and 20 of the vertical tubes, as well as the check valve 15 of the air pump, always below the level of the heavy liquid 16 in the chamber and hence these parts will always be tight as they do not have to be air-tight, but simply liquid-tight, it being understood that it is much easier to maintain joints and valves tight against liquid leakage than against air leakage.

In contemplating my apparatus it will be seen that the pressure chamber 1 is really provided with two controls, one the adjustable air pressure control 17, and the other the liquid escape control pipe or overflow tube 19, the standing column in which becomes a liquid safety valve of constant value.

Having thus described my apparatus it will be manifest that many variations in the actual mechanical connection may be resorted to without departing from the manner of functioning, and any such as fall within the spirit of the invention are intended to be covered in the appended claims.

I claim:

1. A gauge for indicating the level of a liquid comprising a chamber partially filled with a gauging liquid, an air duct having one end connected with the chamber to communicate with the air space above the gauging liquid and having the other end positioned below the level of the liquid to open at the maximum depth to be indicated, an upwardly extending sight tube connected with said chamber and opening below the level of the gauging liquid, and a pump casing mounted in said chamber and having means projecting out of said chamber, and a check valve in said pump casing for compressing the air in the space above the liquid in the chamber, said check valve being submerged in the gauging liquid.

2. A gauge for indicating the level of a liquid comprising a chamber partially filled with a gauging liquid, an air duct having one end connected with the chamber to communicate with the air space above the gauging liquid and having the other end positioned below the level of the liquid to open at the maximum depth to be indicated, an upwardly extending sight tube connected with said chamber and opening below the level of the gauging liquid, an upwardly extending relief tube connected with said chamber and opening below the level of the gauging liquid at a point spaced above the opening of the submerged end of the sight tube, and a pump casing mounted in said chamber for compressing the air in the space above the level of the liquid in the chamber, said pump casing having an operating means projecting beyond the chamber and a check valve submerged in the gauging liquid.

EDWARD L. HUBBARD.